(12) United States Patent
Okuda

(10) Patent No.: US 6,463,363 B1
(45) Date of Patent: Oct. 8, 2002

(54) BACK MONITORING APPARATUS FOR VEHICLE

(75) Inventor: Sadaharu Okuda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/527,249

(22) Filed: Mar. 17, 2000

(30) Foreign Application Priority Data

Mar. 19, 1999 (JP) .......................................... 11-075856

(51) Int. Cl.$^7$ ................................................. G06F 7/00
(52) U.S. Cl. ............................... 701/1; 701/28; 701/41; 701/69; 701/72; 180/168; 340/438; 340/439; 340/461
(58) Field of Search ............................... 701/1, 23, 28, 701/41, 116, 117, 301, 69, 72; 180/168; 340/425.5, 435, 436, 438, 439, 461

(56) References Cited

U.S. PATENT DOCUMENTS

| | | | |
|---|---|---|---|
| 5,765,116 A | * | 6/1998 | Wilson-Jones et al. ....... 701/41 |
| 5,949,331 A | * | 9/1999 | Schofiled et al. ........... 340/461 |
| 6,285,778 B1 | * | 9/2001 | Nakajima et al. ........... 382/104 |

FOREIGN PATENT DOCUMENTS

| | | |
|---|---|---|
| JP | 64-14700 | 1/1989 |
| JP | 10-147178 | 6/1998 |
| JP | 10-322687 | 12/1998 |

OTHER PUBLICATIONS

Patent Abstract of Japan vol. 13, No. 188 (P–866), May 8, 1989 & JP 01 014700 A (Aisin Warner Ltd) Jan. 18, 1989, abstract.

Patent Abstract of Japan vol. 9, No. 223 (M–411), Sep. 10, 1985 & JP 60 080953 A (Nairusu Buhin K.K.) May 8, 1985, abstract.

* cited by examiner

Primary Examiner—Gertrude Arthur
(74) Attorney, Agent, or Firm—Armstrong, Westerman & Hattori, LLP.

(57) ABSTRACT

In the back monitoring apparatus for a vehicle, a path loci of a minimum cornering portion and a maximum cornering portion of the vehicle is predicted, superposed on a back image and then displayed simultaneously superposed on the back image. In this configuration, the safety confirmation and operation by a driver can be improved when a vehicle is backed up by displaying a predicted path locus with excellent visibility.

5 Claims, 6 Drawing Sheets

BACK MONITORING APPARATUS FOR VEHICLE

BACKGROUND OF THE INVENTION

Field of the Invention

The present invention relates to a back monitoring apparatus for a vehicle, and more particularly to a back monitoring apparatus for a vehicle for displaying a predicted path of the vehicle according to a steering angle when the vehicle is backed up in such a manner that it is superposed on a back image on a monitor.

In recent years, a back monitoring apparatus for confirming the back of a vehicle has become prevalent. The feature of a back monitoring apparatus resides in that it permits a vehicle driver to confirm the back (environment) easily in such a manner that the blind spot of a rearview mirror is monitored by a video camera. This feature is efficient the case where the environment of a direct back corner of the vehicle is hidden from view by a cabin as in a truck. Some back monitor apparatus not only displays a back image for a driver, but also displays a predicted path locus of a rear wheel according to a steering angle when the vehicle is backed up which is superposed on the image on a monitor, thereby improving the operability of a driver. An example of these monitoring apparatus is disclosed in JPA64-14700.

Figure 11:
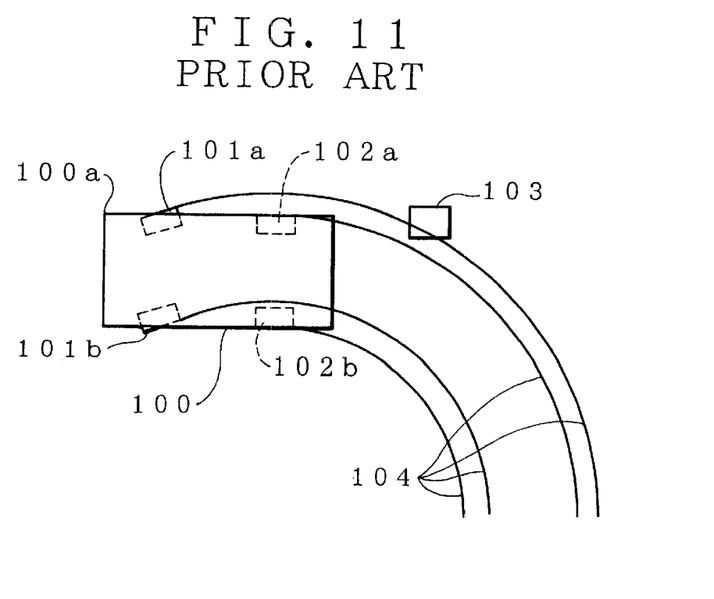
FIG. 11 is a schematic diagram for explaining the predicted path locus of a conventional back monitoring apparatus for a vehicle.

The display of the predicted path locus of the rear wheel disclosed in the above prior art permits the moving direction and vehicle width of one's own vehicle to be visually recognized at first sight. Therefore, the driver can easily back up the vehicle for parking. However, as shown in FIG. 11, in backing-up of the vehicle, when a vehicle 100 is turned clockwise rearwards, a front wheel 101a located outside of the turning turns widely unlike the path of a rear wheel 102a corresponding to it. Therefore, when the driver is plunged into the operation of driving carefully viewing only the interior of the predicted path lines of the rear wheels 102a and 102b, a front body 100a which turns more widely than the rear wheel 102a may be brought into contact with an obstacle 103.

SUMMARY OF THE INVENTION

An object of the present invention is to provide a back monitor which can improve the safety confirmation and operation by a driver when a vehicle is backed up, by displaying a predicted path locus with excellent visibility in order to display a predicted path of the vehicle according to a steering angle when the vehicle is backed up in such a manner that it is superposed on a back image picked up by a video camera on a monitor.

In order to attain the above object, in accordance with the present invention, there is provided a back monitoring apparatus for a vehicle comprising:

a predicted path locus computing means for computing a predicted path locus of a vehicle corresponding to a steering angle when the vehicle is backed up;

a signal processing means for processing the predicted path locus so as to be superposed on a back image picked up by an image pick-up means; and a monitoring means for displaying an image from the data thus superposed, wherein the predicted path locus computing means computes predicted path loci of a minimum cornering portion and a maximum cornering portion of the vehicle, the signal processing means processes the predicted path loci of the minimum cornering portion and the maximum cornering portion so as to be superposed on data of the back image; and the monitoring means simultaneously displays the predicted path loci of the minimum cornering portion and the maximum cornering portion superposed the back image, which are supplied from the signal processing means.

In this configuration, since the predicted path loci of the minimum cornering portion and the maximum cornering portion superposed on the back image are simultaneously displayed, the predicted path direction of the vehicle and vehicle width can be known so that the back confirmation and operability by the driver can be improved.

Preferably, the minimum cornering portion of the vehicle is an inner rear wheel, the maximum cornering portion of the vehicle is a front corner of an outer shape of the vehicle, the predicted path locus of the vehicle includes that of an outer rear wheel.

In this configuration, since the predicted path loci of both rear wheels and the maximum cornering portion are simultaneously displayed, a driver can discern the back-up direction and presence or absence of accessible space of the vehicle.

Preferably, the predicted loci are displayed in display formats in which they are distinguishable from each other.

In this configuration, since the predicted path loci of both rear wheels and the maximum cornering portion which are simultaneously displayed can be recognized individually according to their different display formats, they can be displayed with good visibility so that the predicted path loci of the rear wheels can be distinguishable from the maximum cornering portion.

Preferably, the display format is composed of a line type, a display color, a line width and a combination thereof. In this configuration, since the predicted path loci of both rear wheels and the maximum cornering portion are displayed in different display formats each composed of a line type, a display color, a line width and a combination thereof, a difference in the predicted path loci can be made clear and the driver can easily discern the difference.

Preferably, the predicted path locus of the maximum cornering portion has a turning radius computed from $$R\max = \left| \sqrt{(Rout^2 + L^2)} \right|$$

where Rout: a turning radius of an outer rear wheel when a vehicle is backed up, L: a distance between a rear wheel shaft and a front corner of an outer shape of the vehicle.

In this configuration, the predicted path locus of the maximum cornering portion can be displayed using the computed turning radius.

The above and other objects and features of the present invention will be more apparent from the following description taken in conjunction with the accompanying drawings.

DESCRIPTION OF THE PREFERRED EMBODIMENTS

Now referring to FIGS. 2–10, an explanation will be given of an embodiment of the back monitoring apparatus for a vehicle according to the present invention.

Figure 1:
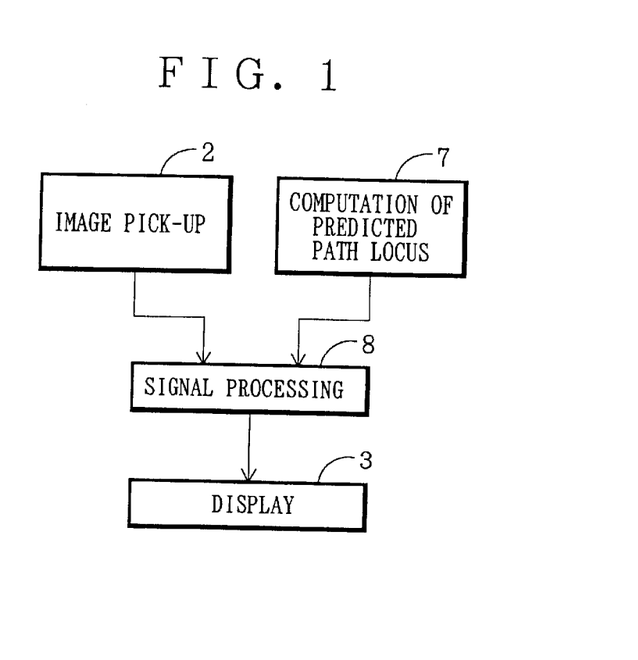
FIG. 1 is a block diagram of a basic arrangement of the back monitoring apparatus for a vehicle according to the present invention.
Figure 2:
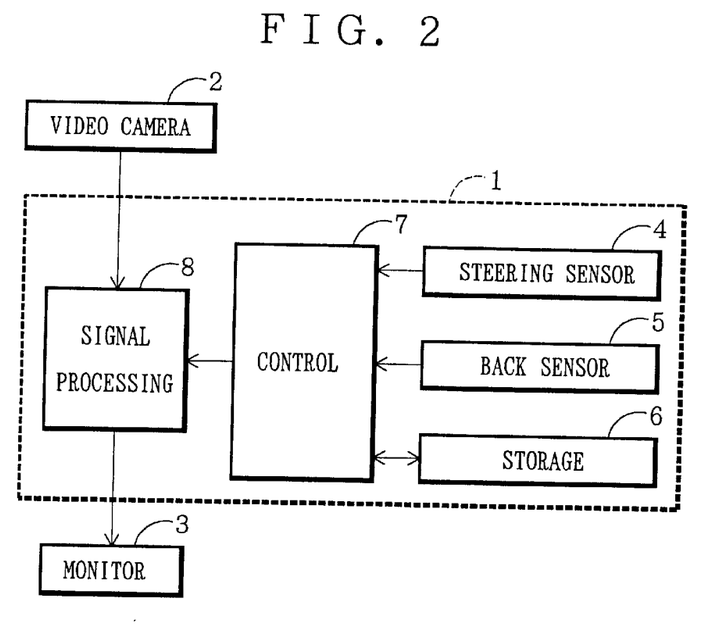
FIG. 2 is a block diagram of an embodiment of the back monitoring apparatus for a vehicle according to the present invention.

FIG. 2 is a block diagram showing an embodiment of the back-monitoring apparatus for a vehicle according to the present invention. In FIG. 2, the back monitoring apparatus includes a controller 1, a video camera 2 serving as an image pick-up means and a monitor 3 serving as display means. The controller 1 includes a steering sensor 4, a back sensor 5, a storage unit 6, a control unit 7 serving as a means for computing a predicted path locus and a signal processing unit 8. The video camera 2, which is attached to the outside of the vehicle, for example, supplies image data obtained by picking up the back scene of the vehicle to the controller 1. The monitor 3 displays a superposed image of the back image taken by the video camera 2 and supplied from the controller 1 and a predicted path locus when the vehicle is backed up which is computed by the controller 7.

In the controller 1, a steering sensor 4 produces a signal indicative of turning information of a vehicle according to a handling helm angle (steering angle) which varies by a handling operation when the vehicle is backed up. The back sensor 5 produces an ON/OFF signal for determining whether or not the vehicle is being backed up. The back sensor 5 is attached to e.g. a transmission mechanism (not shown) of the vehicle. When the gear position of the transmission mechanism is shifted to the back (reverse) position which is used when the vehicle is backed up, an ON signal is produced. When it is shifted to the other position than the reverse, an OFF signal is produced.

The storage unit 6 stores parameter values required to compute the exhibition position of the predicted path locus of a vehicle on a monitor screen of the monitor 3. The storage unit 6 stores a display format selecting table which includes a plural kinds of lines (e.g. solid line, dotted line, etc.), a plurality of display colors (white, black, red, etc.), and a plurality of line widths). The storage unit 6 is a frame memory which temporarily stores image data captured from the video camera 2.

The control section 7, which can be constructed of a microcomputer, etc., serves to compute the plotting position on the monitor screen of the monitor 3 of the predicted path locus of the vehicle according to the steering angle when the vehicle is backed up. The signal processing unit 8 superposes data of the plotting position thus computed on the image signal outputted from the video camera 2 and sends the resultant image to the monitor 3.

Figure 3:
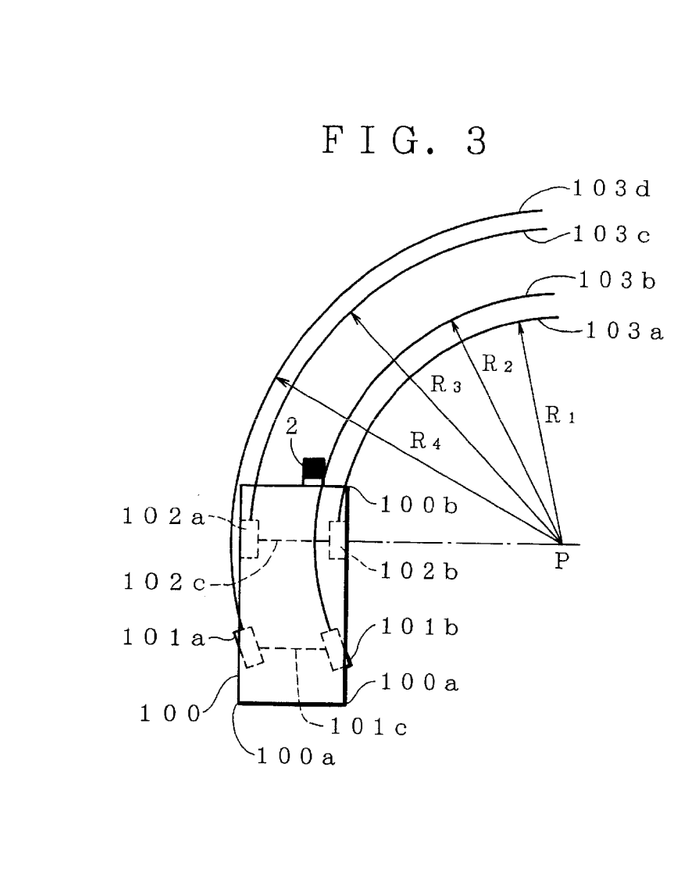
FIG. 3 is a schematic diagram for explaining the turning manner of the front and rear wheels and their turning radii when a vehicle is backed up.

Referring to FIG. 3, an explanation will be given of the summary of the present invention.

As shown in FIG. 3, during a low speed running (slippage of tires is negligible), when a vehicle 100 moves to turn backward, it turns around a certain point p (center point) extended from a rear wheel shaft 102c. In this case, the turning radius of the vehicle is determined by the distance between the center point p and each of wheels 101a, 101b; and 102a, 102b. Therefore, the turning radii R1, R2, R3 and R4 of the predicted path loci 103a, 103b, 103c and 103d of the wheels 101a, 101b, 102a and 102b are from one another. The inner rear wheel 102b turns along the innermost line. Likewise, the car body provides a minimum turning radius in the vicinity of the inner side 100b of the inner rear wheel. Further, it provides a maximum turning radius in the vicinity of the a front bumper corner 100a. Therefore, the vehicle 100 passes the back space confined by the minimum turning radius and the maximum turning radius. For this reason, the car body will not be brought into contact with an obstacle as long as the driver can monitor such a back space through the video camera.

In view of such a fact, the present invention superposedly displays the predicted path loci 103a, 103c of the rear wheels 102a and 102b and a part of the car body providing the maximum turning radius (hereinafter referred to as a maximum cornering portion) (i.e. predicted path locus of the front corner 100a of the outer shape of the vehicle) on a back image taken from the video camera 2. Thus, the driver can confirm the running direction and the presence or absence of a vehicle traveling space. In addition, the driver can know his monitoring rage through the exhibition of the maximum cornering portion, i.e. the predicted path locus of the front corner 100a.

In this case, if the predicted path loci of the rear wheels and the maximum cornering portion are exhibited in the same line, the driver may confuse these loci. Taking this into consideration, in accordance with the present invention, these predicted path loci are discriminated from one another using different exhibition formats with respect to a line kind, line color, width, etc. For example, the predicted paths of the rear wheels 102a and 102b are exhibited in solid line, whereas that of the maximum cornering portion 100a is exhibited in dotted line. In this way, the driver can easily discriminate these predicted path loci from one another.

A detailed explanation will be given of the operation of the present invention.

When the vehicle is backed up, the control section 7 receives an ON signal from the back sensor 5 representative of that the vehicle is being moved backward and also receives the signal from the steering sensor 4 representative of the turning information of the vehicle corresponding to the steering angle.

On the basis of the signal representative of the turning information of the vehicle according to the steering angle from the steering sensor 4 and the parameter values read from the storage unit 6, the control section 7 computes the plotting positions of the monitoring screen of the monitor 3 of the predicted path loci of the rear wheels 102a and 102b and the maximum cornering portion 100a.

An explanation will be given of a method of computing the plotting positions of the predicted path loci.

Figure 4:
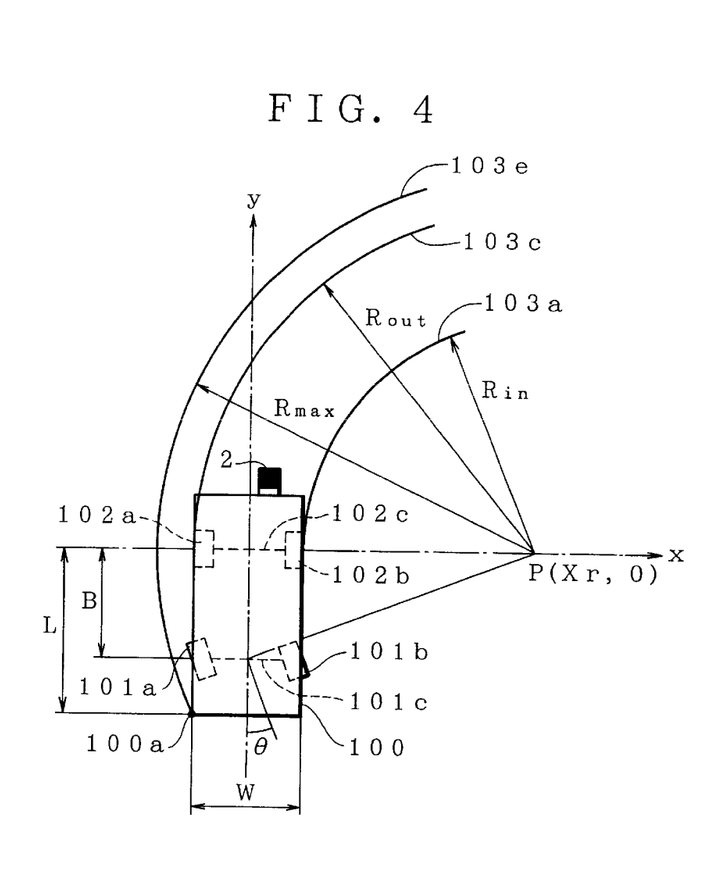
FIG. 4 is a schematic diagram for explaining a method of computing predicted path loci.

As shown in FIG. 4, it is assumed that the vehicle 100 corners around a point P (Xr, 0) on an X-Y coordinate with an origin of the mid point of the rear wheel shaft 102c. Further, it is assumed that the turning radius of the inner rear wheel 102b is Rin, that of the outer rear wheel 102a is Rout, and that of the maximum cornering portion of the vehicle is Rmax. Incidentally, these turning radii can be computed using equations representative of the relationship between the steering angle and the turning radii which have been acquired experimentally. By replacing the vehicle by a tricycle, the turning radii R1n, Rout and Rmax can be approximated as represented by Equations (1), (2), (3) and (4).

$$x_r = \frac{B}{\tan\theta} \tag{1}$$

(leftward steering θ>0, rightward steering θ<0)

$$R_{in} = |x_r| - W/2 \tag{2}$$

$$R_{out} = |x_r| + W/2 \tag{3}$$

$$R_{max} = \left|\sqrt{(R_{out}^2 + L^2)}\right| \tag{4}$$

where B: a distance between a front wheel shaft 101c and the rear wheel shaft 102c, θ: a steering angle, W: vehicle width (distance between the outer walls of left and right tires), L: front corner of the outer shape of the vehicle (i.e. the front bumper corner on the side of the outer rear wheel in this example) and the rear wheel shaft 102c.

The locus coordinate of the vehicle which corners with the turning radius R around the point P (Xr, 0) can be obtained from Equation (5)

$$(x-x_r)^2 + y^2 = R^2 \tag{5}$$

(R=Rin, Rout, Rmax)

Figure 5A:
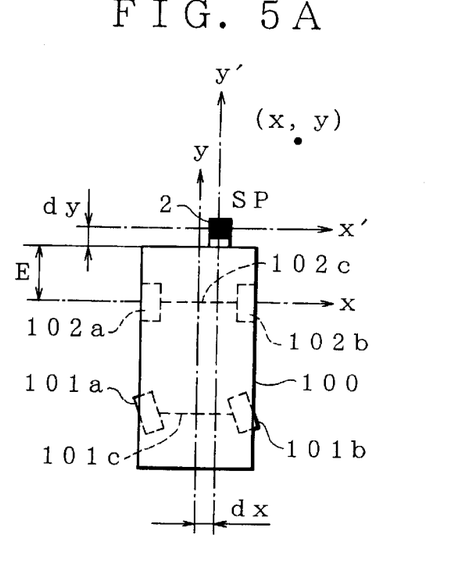
FIGS. 5A and 5B are schematic plan and side views for explaining the state where a video camera is attached, respectively.
Figure 5B:
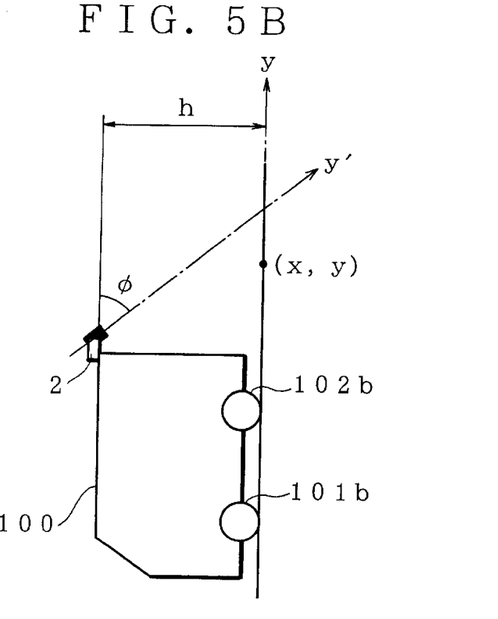
Figure 6:
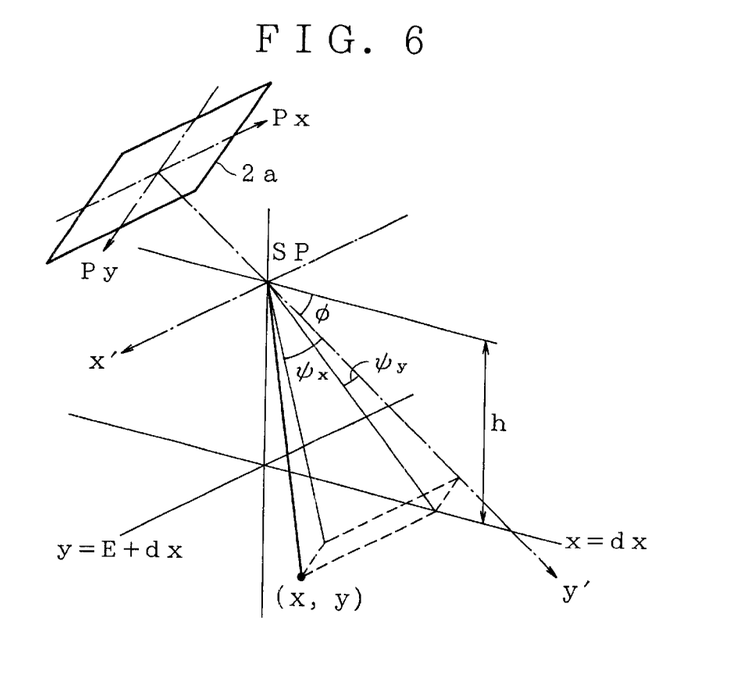
FIGS. 6 and 7 are schematic diagrams for explaining coordinate conversion from a spatial coordinate to an image pick-up plate, respectively.
Figure 7:
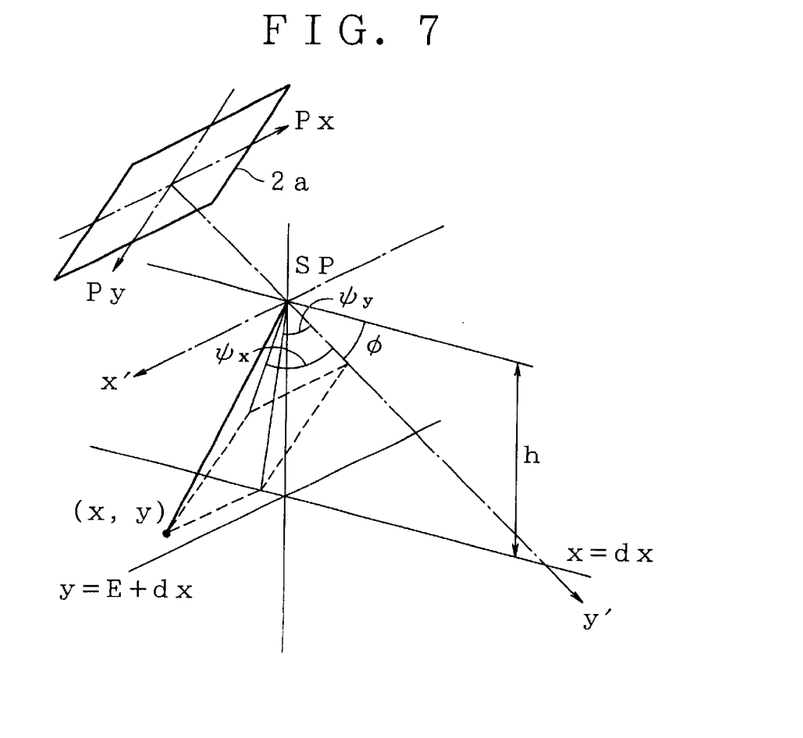
Figure 8:
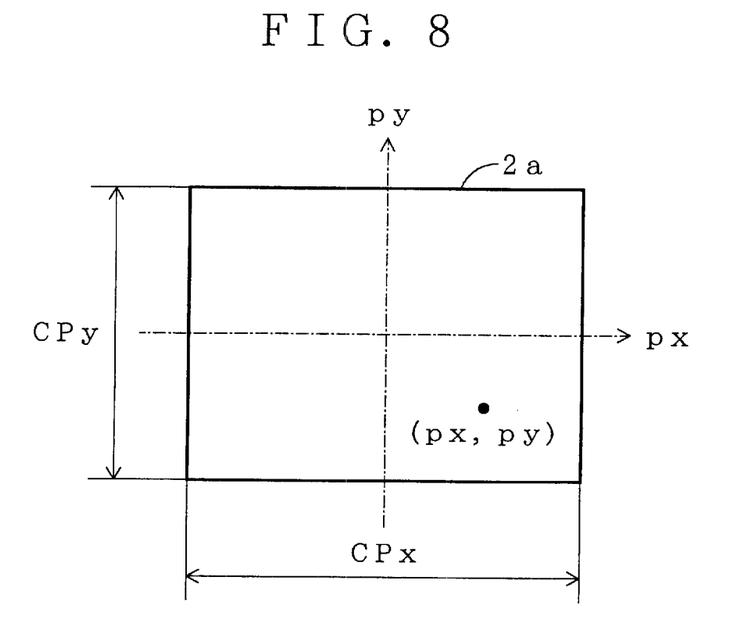
FIG. 8 is a schematic diagram for explaining the coordinate standard point on an image pick-up plate of a video camera.

Now, as shown in FIGS. 5A and 5B, it is assumed that the locus computed by Equation (5) is picked up by a video camera installed at a position displaced from the center of the back of the vehicle 100 by dx in a X-direction and dy in a Y-direction in a direction of an optical axis having a lying angle of φ. In this case, as shown in FIGS. 6 and 7, the respective points P(x, y) on the locus are converted from a spatial coordinate to a plane coordinate (pick-up plate) by Equation (7). The coordinate standard point of the pick-up plate 2a is an optical axis of the video camera 2.

$$[p_x, p_y] = \left[\frac{CP_x \cdot \tan\varphi_x\{1 + k \cdot f^2(\tan^2\varphi_x + \tan^2\varphi_y)\}}{2\tan\frac{W_x}{2}\left\{1 + k \cdot f^2\left(\tan^2\frac{W_x}{2} + \tan^2\frac{W_y}{2}\right)\right\}}, \frac{CP_y \cdot \tan\varphi_y\{1 + k \cdot f^2(\tan^2\varphi_x + \tan^2\varphi_y)\}}{2\tan\frac{W_y}{2}\left\{1 + k \cdot f^2\left(\tan^2\frac{W_x}{2} + \tan^2\frac{W_y}{2}\right)\right\}}\right] \tag{6}$$

$$\varphi_x = \tan^{-1}x - \frac{dx}{\left|\sqrt{h^2 + (y - E - dy)^2} \cdot \cos\varphi_y\right|} \tag{7}$$

$$(\text{if } y \geq E + dy)\varphi_y = \phi - \tan^{-1}\frac{h}{y - E - dy} \tag{8}$$

$$(\text{if } y < E + dy)\varphi_y = \pi - \phi + \tan^{-1}\frac{h}{y - E - dy} \tag{9}$$

where Wx: a horizontal view angle of the video camera 2, Wy: a vertical view angle of the video camera 2, k: a lens aberration coefficient, f: a focal distance of the video camera, Cpx: number of pixels on the pick-up plate 2a of the video camera in a horizontal direction, Cpy: number of pixels on the pick-up plate 2a of the video camera in a vertical direction, E: a distance between the back of the vehicle 100 and the rear wheel axis 102c, h: a vehicle height of the vehicle 100.

Figure 9:
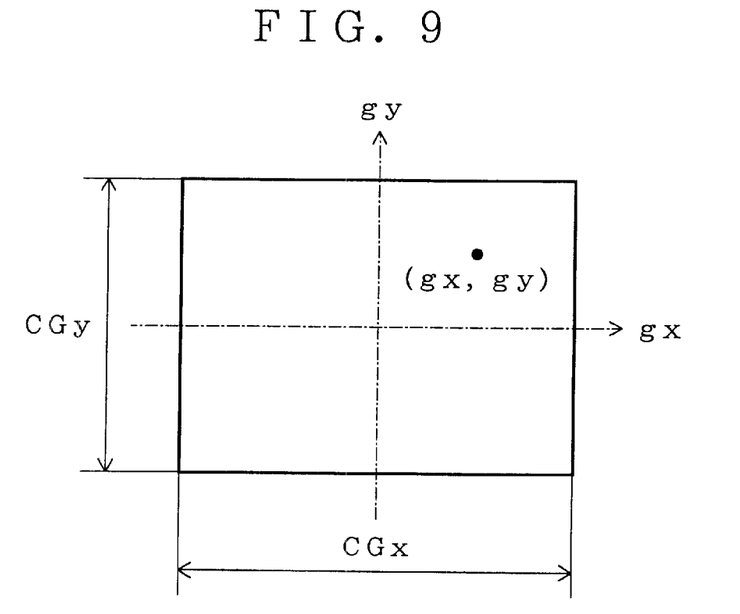
FIG. 9 is a schematic diagram for explaining the standard point of a monitor screen.

Further, coordinate conversion is made from the image pick-up plate 2a to the monitor 3. Therefore, the points of the locus are displayed on the coordinate computed by Equation (10). The coordinate standard point on the monitor is an optical axis of the video camera 2 (see FIG. 9).

$$[g_x, g_y] = \left[\frac{CG_x}{CP_x} \cdot p_x, \frac{CG_y}{CP_y} \cdot p_y\right] \tag{10}$$

where CGx: number of pixels on the monitor in the horizontal direction, Cgy: number of pixels on the monitor in the vertical direction.

Thus, on the basis of the coordinates of the locus points computed from Equations (1)–(10), the predicted path loci of the vehicle rear wheels 102a and 102b according to the steering angle and that of the maximum cornering portion 100a of the car body can be displayed on the monitor 3.

The control section 7 supplies to the signal processing section 8 the position data the predicted path loci of the vehicle rear wheels 102a and 102b according to the steering angle and that of the maximum cornering portion 100a of the car body, and display format information of the kind of line, display color or line width or any combination thereof which is read from the display format table stored in the storage unit 6. The signal processing unit 8 superposes the data of the respective path loci inclusive of the selected display format on the back image signal produced from the video camera 2, and send the superposed data to the monitor 3. The monitor 3 displays the predicted path loci superposed on the back image on the monitoring screen. For example, the predicted path loci of the vehicle rear wheels 102a and 102b are displayed in white solid line, and that of the maximum cornering portion 100a of the car body is displayed in red dotted line.

Therefore, by confirming the predicted path loci of the vehicle rear wheels 102a, 102b and the maximum cornering portion 100a, the driver can know the space through the vehicle passes. This makes it easy to ensure the back safety and improve the operability.

Figure 10:
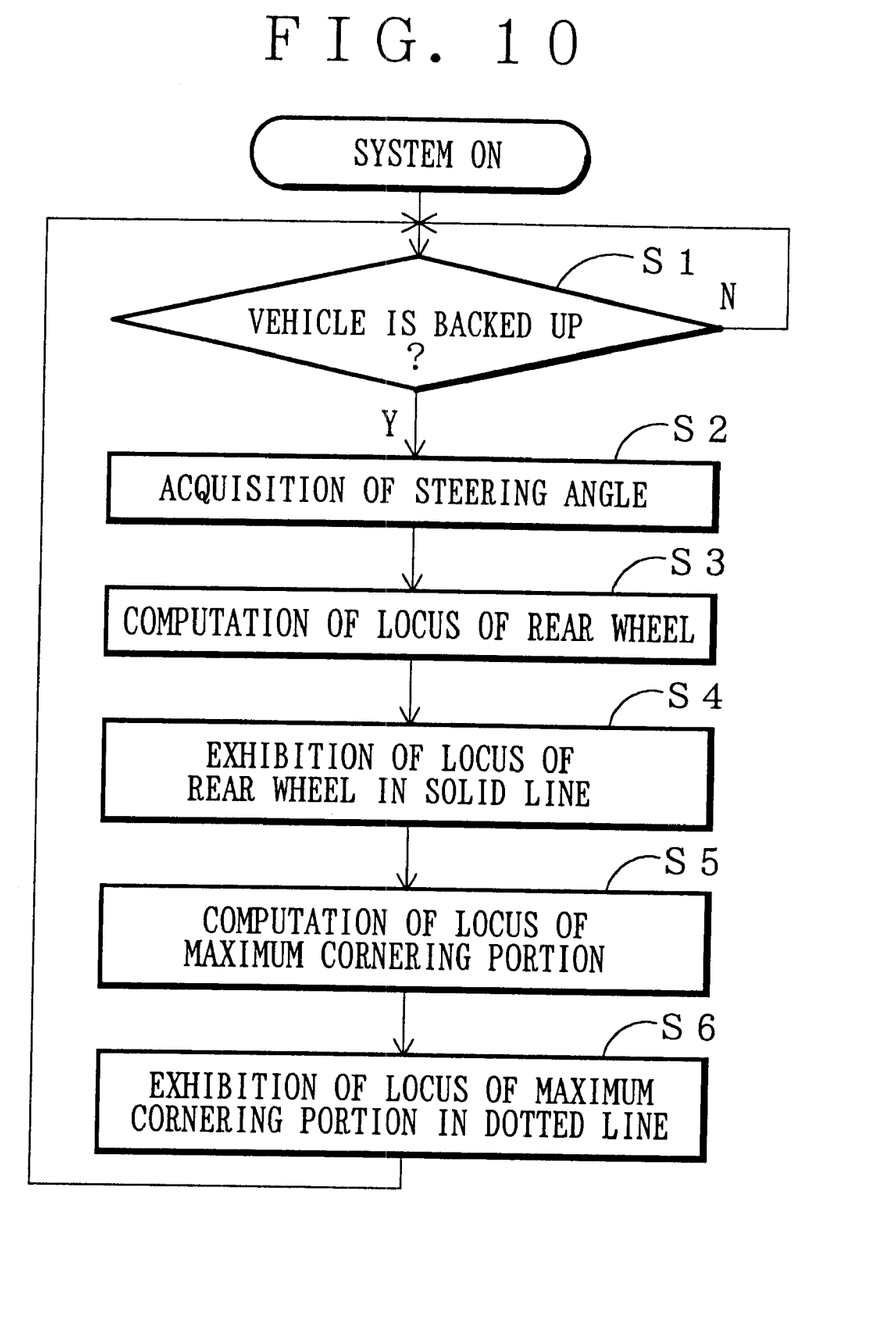
FIG. 10 is a flowchart showing the operation in the block diagram of FIG. 2.

Referring to the flowchart shown in FIG. 10, an explanation will be given of the above operation.

When the vehicle starts to backup (step S1), the control section 7 starts to acquire the signal according to the steering angle from the steering sensor 4 (step S2). In accordance with the turning information from the steering sensor 4, the control section 7 computes the predicted path loci of the vehicle rear wheels 102a, 102b and supplies these computed predicted path loci to the signal processing section 8 as information to be displayed in solid line (step S3).

The signal processing section 8 superposes the predicted path loci information of the vehicle rear wheels 102a, 102b supplied from the control section 7 on the back image data produced from the video camera 2, and supplies the information thus created to the monitor 3. The monitor 3 displays the predicted path loci of the vehicle rear wheels 102a, 102b superposed in solid line on the back image on the monitor screen. Next, the control section 7 computes the predicted path locus of the maximum cornering portion 100a and supplies the computed locus to the signal processing section 8 as information to be exhibited in dotted line (step S5).

The signal processing section 8 superposes the predicted path locus information of the maximum cornering portion 100a supplied from the control section 7 on the back image data produced from the video camera 2, and supplies the information thus created to the monitor 3. The monitor 3 displays the predicted path locus of the maximum cornering portion 100a superposed in dotted line on the back image and the predicted loci of the vehicle path rear wheels 102a, 102b (step S6).

What is claimed is:

1. A back monitoring apparatus for a vehicle comprising:
    a predicted path locus computing means for computing a predicted path locus of a vehicle corresponding to a steering angle when the vehicle is backed up;
    a signal processing means for processing the predicted path locus so as to be superposed on a back image picked up by an image pick-up means; and
    a monitoring means for displaying an image from the data thus superposed,
    wherein said predicted path locus computing means computes predicted path loci of a minimum cornering portion and a maximum cornering portion of the vehicle,
    said signal processing means processes said predicted path loci of the minimum cornering portion and the maximum cornering portion so as to be superposed on said back image; and
    said monitoring means simultaneously displays said predicted path loci of the minimum cornering portion and the maximum cornering portion superposed said back image, which are supplied from said signal processing means; and
    wherein said minimum cornering portion of the vehicle is an inner rear wheel, said maximum cornering portion of the vehicle is a front corner of an outer shape of the vehicle, and the predicted path locus of the vehicle includes that of an outer rear wheel;
    wherein said predicted path locus of the maximum cornering portion has a turning radius computed from $$R\max = \left| \sqrt{(Rout^2 + L^2)} \right|$$

where Rout: a turning radius of an outer rear wheel when a vehicle turns backwards, L: a distance between a rear wheel shaft and a front corner of an outer shape of the vehicle.

2. A back monitoring apparatus according to claim 1, wherein said predicted loci are displayed in display formats in which they are distinguishable from each other.

3. A back monitoring apparatus according to claim 2, wherein each said display formats is composed of a line type a display color, a line width and a combination thereof.

4. A back monitoring apparatus according to claim 1, wherein said predicted loci are displayed in display formats in which they are distinguishable from each other.

5. A back monitoring apparatus according to claim 4, wherein each said display formats is composed of a line type a display color, a line width and a combination thereof.

* * * * *